(12) United States Patent
Gordon (10) Patent No.: US 8,483,287 B2
(45) Date of Patent: Jul. 9, 2013

(54) COURSE DIFFERENCE ESTIMATION DECOUPLING

(75) Inventor: Stephen Gordon, North Andover, MA (US)

(73) Assignee: Broadcom Corporation, Irvine, CA (US)

(*) Notice: Subject to any disclaimer, the term of this patent is extended or adjusted under 35 U.S.C. 154(b) by 3104 days.

(21) Appl. No.: 10/871,657

(22) Filed: Jun. 17, 2004

(65) Prior Publication Data

US 2004/0258158 A1  Dec. 23, 2004

Related U.S. Application Data

(60) Provisional application No. 60/480,415, filed on Jun. 20, 2003.

(51) Int. Cl.
*H04N 7/12* (2006.01)

(52) U.S. Cl.
USPC .................................... 375/240.26

(58) Field of Classification Search
USPC ............ 375/240.01, 240.02, 240.24, 240.26; 382/239

IPC ........................................................ H04N 7/12
See application file for complete search history.

(56) References Cited

U.S. PATENT DOCUMENTS 6,292,589 B1 * 9/2001  Chow et al. .................. 382/239

* cited by examiner

*Primary Examiner* — Young Lee
(74) *Attorney, Agent, or Firm* — Brinks Hofer Gilson & Lione (57) ABSTRACT

A method and system for processing information (e.g., encoding video data) may include identifying a plurality of sets of data blocks. Such data blocks may, for example, be stored in a memory. One or more candidate data blocks may be selected from one or more of the sets of data blocks. Such a selection may be based on a first selection criterion. A candidate block selection module may, for example, perform the selection. One or more reference data blocks may be selected from the candidate data blocks. Such a selection may be based on a second selection criterion. A reference block selection module may, for example, perform the selection. The reference data block(s) may be utilized to process information. In an exemplary scenario, a reference block may be utilized to encode a current video data block, which may then be communicated to a receiving entity.

5 Claims, 4 Drawing Sheets

COURSE DIFFERENCE ESTIMATION DECOUPLING

CROSS-REFERENCE TO RELATED APPLICATIONS/INCORPORATION BY REFERENCE

This patent application is related to and claims priority from provisional patent application Ser. No. 60/480,415 filed Jun. 20, 2003, and titled "VIDEO DATA PROCESSING," the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

In information encoding systems, processing time constraints are often strict. For example, in video information encoding systems (in particular real-time video information encoding systems), relatively large amounts of data must often be encoded in a timely manner. Various systems may utilize parallel processing to more efficiently process information. However, in information processing scenarios where a second processing operation depends on results of a first processing operation, serial processing of some sort may be essential.

For example and without limitation, an exemplary video encoding system may be based on a block estimation strategy, where blocks of video information are encoded in light of other video data blocks (e.g., previously processed video data blocks). Processing a current video data block may, for example, require knowledge of a previously processed video data block. In one exemplary scenario, video encoding may comprise determining a quality and/or data communication cost associated with utilizing information of one or more particular reference data blocks to encode the current video data block. The determination of such a cost may, for example, require that the reference block(s) be processed prior to processing the current video block.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention may comprise a method and system for processing information. In an exemplary scenario, the information may comprise a current video data block that is to be encoded utilizing one or more reference data blocks.

Various aspects of the present invention may comprise identifying a plurality of sets of data blocks. Such data blocks may, for example, be stored in a memory. In an exemplary scenario, the data blocks may correspond to video data blocks in a previous video frame of a video frame sequence. Such sets of data blocks may, for example, represent a contiguous spatial region in a video frame or may, for example, represent a non-contiguous or sampled region.

One or more candidate data blocks may be selected from one or more of the sets of data blocks. Such a selection may be based on a first selection criterion. A candidate block selection module may, for example, perform the selection. The first selection criterion may, for example and without limitation, comprise determining and utilizing an indication of match quality between data blocks and a current data block. In an exemplary video scenario, the first selection criterion may, for example, be determined prior to encoding the previous video frames that will be utilized to encode a current video frame.

One or more reference data blocks may be selected from the candidate data blocks. Such a selection may be based on a second selection criterion. A reference block selection module may, for example, perform the selection. The second selection criterion may, for example and without limitation, comprise determining and utilizing an indication of match cost for the candidate data blocks. The second selection criterion may, for example, comprise utilizing indications of match quality and match cost. In an exemplary video-processing scenario, at least a portion of the second selection criterion may, for example, be determined after the encoding of all previous video frames that will be utilized to encode a current video frame. In an exemplary video-processing scenario where the second selection criterion comprises utilizing match quality and match cost, match quality may depend on information in previous video frames, while match cost may depend on the encoding of previous blocks in the current video frame.

The reference data block(s) may be utilized to process information. In an exemplary video scenario, one or more reference blocks may be utilized to encode a current video data block, which may then be communicated to a receiving entity. Such encoding and communication may, for example, be performed by an encoding module and communication module, respectively.

These and other advantages, aspects and novel features of the present invention, as well as details of illustrative aspects thereof, will be more fully understood from the following description and drawings.

DETAILED DESCRIPTION OF THE INVENTION

Figure 1:
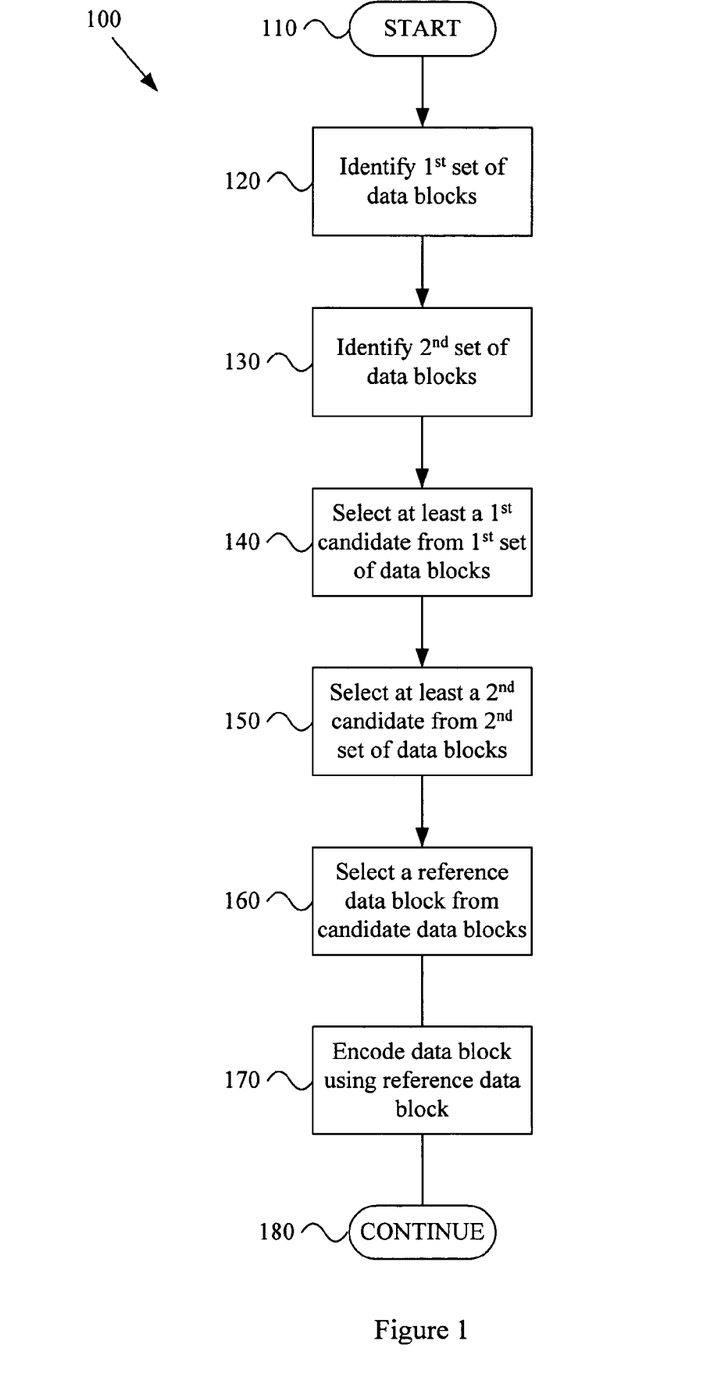
FIG. 1 is a flow diagram illustrating an exemplary method for processing data, in accordance with various aspects of the present invention.

FIG. 1 is a flow diagram illustrating an exemplary method 100 for processing data, in accordance with various aspects of the present invention.

The method 100 begins at step 110. The method 100 may begin for any of a variety of causes and conditions. For example and without limitation, the method 100 may begin automatically upon system power-up or upon arrival of data to process. Alternatively, for example, the method 100 may begin in response to a direct user command. Accordingly, the scope of various aspects of the present invention should not be limited by characteristics of any particular initiating event or condition.

The method 100, at step 120, may comprise identifying a first set of data blocks. The data blocks may, for example, comprise blocks of video information or other types of information. The first set of data blocks may be selected according to any of a large variety of criteria. In an exemplary video scenario, the first set of data blocks may comprise data blocks with a close spatial or temporal relationship. For example and without limitation, in an exemplary scenario comprising predictive block encoding, the first set of data blocks may comprise video data blocks that are predicted to result in a similar amount of encoding side information. Also, for example, the first set of data blocks may comprise data blocks with generally similar data content. In general, the first set of data blocks may be selected according to any of a large variety of selection criteria. Accordingly, the scope of various aspects of the present invention should not be limited by characteristics of a particular selection criterion for the first set of data blocks.

The method 100, at step 130, may comprise identifying a second set of data blocks. Step 130 may, for example, share various aspects with step 120 discussed previously. For example, the data blocks may, for example, comprise blocks of video information or other types of information. The second set of data blocks may be selected according to any of a large variety of criteria. In an exemplary video scenario, the second set of data blocks may comprise data blocks with a close spatial or temporal relationship. For example and without limitation, in an exemplary scenario comprising predictive block encoding, the second set of data blocks may comprise video data blocks that are predicted to result in a similar amount of encoding data. Also, for example, the second set of data blocks may comprise data blocks with generally similar data content. In general, the second set of data blocks may be selected according to any of a large variety of selection criteria. Accordingly, the scope of various aspects of the present invention should not be limited by characteristics of a particular selection criterion for the second set of data blocks.

Also, for example, the second set of data blocks may be related to the first set of data blocks or may be independent of the first set of data blocks. For example, in an exemplary video data processing scenario, the second set of data blocks may comprise a group of video data blocks that are spatially adjacent to a group of video data blocks making up the first set of data blocks. Also for example, the second set of data blocks may be temporally related to the first set of data blocks (e.g., from a previous, identical or subsequent time instance). Accordingly, the scope of various aspects of the present invention should not be limited by characteristics of a particular relationship between the first set of data blocks and the second set of data blocks.

The method, at step 140, may comprise selecting at least a first candidate data block from the first set of data blocks based at least in part on a first selection criterion. Step 140 may, for example, utilize the first selection criterion to compare a portion or all of the data blocks in the first set of data blocks identified at step 120 to determine one or more candidate data blocks from the first set of data blocks for further processing.

For example and without limitation, the first selection criterion may comprise determining a respective match quality between one or more of the data blocks in the first set of data blocks and a current data block. Step 140 may, for example, comprise utilizing any of a large number of indications of match quality between data blocks.

In an exemplary video scenario, the first selection criterion may comprise comparing the data in each data block of the first set of data blocks to data in a current video data block that is to be encoded. Such comparison may, for example, include comparing corresponding pixel information in the data blocks to the pixel information in the current video data block. Such comparison may, for example, comprise determining a sum of squared differences or sum of absolute differences between corresponding pixels.

Such a comparison may also, for example, comprise positioning and analyzing each compared data block at a variety of spatial positions relative to the current video data block. The results of the comparison may, for example, yield one or more candidate data blocks in the first set of data blocks that best match the current video data block.

In general, step 140 may comprise selecting at least a first candidate data block from the first set of data blocks based at least in part on a first selection criterion. Accordingly, the scope of various aspects of the present invention should not be limited by characteristics of a particular selection criterion.

The method 100, at step 150, may comprise selecting at least a second candidate data block from the second set of data blocks based at least in part on the first selection criterion. Step 150 may, for example and without limitation, share various characteristics with step 140 as previously discussed. For example, step 150 may utilize the first selection criterion to compare a portion or all of the data blocks in the second set of data blocks identified at step 130 to determine one or more candidate data blocks from the second set of data blocks for further processing.

The method, at step 160, may comprise selecting a reference data block from the set of candidate data blocks based at least in part on a second selection criterion. The set of candidate data blocks may, for example, comprise the candidate data blocks identified in steps 140 and 150. The second selection criterion may, for example, be substantially different than the first selection criterion.

Step 160 may, for example, utilize the second selection criterion to compare a portion or all of the candidate data blocks (e.g., as selected at steps 140 and 150) to determine one or more reference data blocks to utilize in encoding the current data block.

For example and without limitation, the second selection criterion may comprise determining a respective match cost between one or more of the candidate data blocks, and selecting a reference data block from the candidate data blocks based at least in part on the determined respective match costs. Step 160 may, for example, comprise utilizing any of a large number of indications of match cost to compare the candidate data blocks. Various exemplary match costs may, for example and without limitation, comprise an amount of data in a resulting encoded block, amount of distortion associated with an encoded block, degree of difference between a resulting motion vector and one or more reference motion vectors, extent of difference between a resulting set of motion side information and one or more reference sets of motion side information, etc.

In an exemplary video scenario, step 160 may comprise determining match cost for a candidate data block as a function of the amount of data that would be needed to encode the current video data block utilizing the candidate data block.

Such a match cost determination may, for example, comprise estimating an amount of data or determining an exact amount of such data.

For example and without limitation, the second selection criterion may comprise utilizing aspects of the first selection criterion utilized previously in steps 140 and 150. For example, step 160 may utilize previously determined respective match quality indications to compare the candidate blocks. Step 160 may, for example, compare the candidate blocks based on a function of match quality and match cost. Such a function may, for example, comprise a weighted average of match quality and match cost.

In general, step 160 may comprise selecting a reference data block from the set of candidate data blocks based at least in part on a second selection criterion. Accordingly, the scope of various aspects of the present invention should not be limited by characteristics of a particular second selection criterion.

The method 100, at step 170, may comprise utilizing information of the selected reference data block(s) to encode the current data block. For example, step 170 may comprise utilizing the selected reference data block(s) as the sole reference block(s) or a portion of a larger set of reference blocks to encode the current data block in a block-encoding scheme.

The method 100, at step 180, continues processing. Such continued processing may, for example, comprise encrypting sensitive encoded information. Such continued processing may, for example comprise encoding additional data and/or communicating encoded data to a receiving entity. Such a receiving entity may, for example, be remote from the system implementing the method 100. For example, such a remote entity may comprise a television, telephone, computer, modem, database, radio, etc. In general, step 180 may comprise performing continued processing on encoded data, and accordingly, the scope of various aspects of the present invention should not be limited by characteristics of particular continued processing.

It should be stressed that though various aspects of the method 100 illustrated in FIG. 1 were exemplified previously with video data processing examples, the scope of various aspects of the present invention should by no means be limited to characteristics of video information processing.

Figure 2:
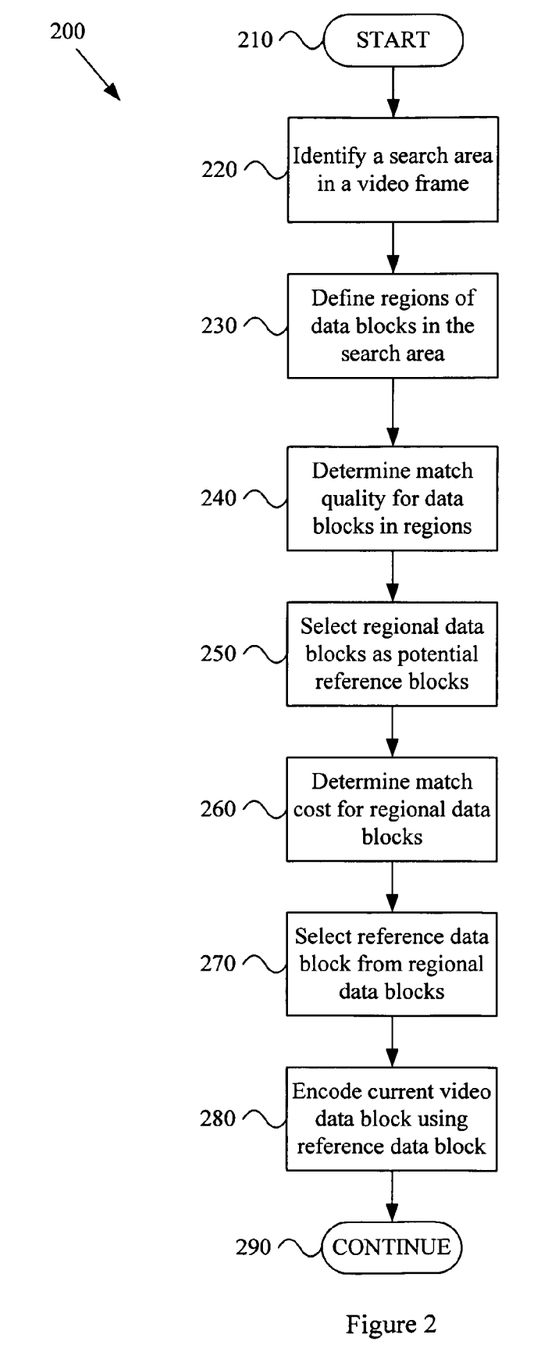
FIG. 2 is a flow diagram illustrating an exemplary method for processing video data, in accordance with various aspects of the present invention.

FIG. 2 is a flow diagram illustrating an exemplary method 200 for processing video data, in accordance with various aspects of the present invention. The exemplary method 200 may, for example and without limitation, share various aspects with the method 100 illustrated in FIG. 1 and discussed previously.

The method 200 may begin at step 210. The method 200 may begin for any of a variety of causes and conditions. For example and without limitation, the method 200 may begin automatically upon system power-up or upon arrival of data to process. Alternatively, for example, the method 200 may begin in response to a direct user command. Accordingly, the scope of various aspects of the present invention should not be limited by characteristics of any particular initiating event or condition.

The method 200, at step 220, may comprise identifying a search area in a video frame. The search area may, for example, comprise a plurality of video data blocks that may be utilized as reference video data blocks for encoding a current video data block. For example and without limitation, in an exemplary scenario where a current video data block in a current video frame is to be encoded, the search area may comprise a group of video data blocks in a previous video frame that covers an area generally spatially corresponding to an area of the current video frame that comprises the current video data block.

The identified search area may generally comprise any of a variety of search area characteristics. For example, the search area may be contiguous or not, the search area may cover a variety of geographical shapes and sizes. Accordingly, the scope of various aspects of the present invention should not be limited by characteristics of a particular search area.

The method 200, at step 230, may comprise defining a plurality of regions within the search area, where each region comprises a plurality of data blocks. For example, step 230 may comprise defining the plurality of regions according to a predetermined template or according to real-time changing image conditions. Various regions may, for example, be fixed size or adjustable size.

In one exemplary scenario, step 230 may comprise defining a plurality of regions within the search area such that the plurality of video data blocks in a particular region are determined (e.g., predicted) to have substantially similar respective match costs. Match cost was generally discussed previously with regard to the exemplary method 100 illustrated in FIG. 1. Such a determination may, for example, be based on a spatial relationship between video data blocks in a defined region or may, for example, be based on similar content between video data blocks in a defined region.

In general, step 230 may comprise defining a plurality of regions within the search area, where each region comprises a plurality of data blocks. Accordingly, the scope of various aspects of the present invention should not be limited by characteristics of particular regions or groups of data blocks or methods for defining such regions or groups.

The method 200, at step 240, may comprise determining a respective match quality for at least one of the plurality of data blocks in at least one (e.g., one, two or each) of the plurality of regions. Match quality was generally discussed previously with regard to the exemplary method 100 illustrated in FIG. 1.

Match quality may, for example and without limitation, comprise information of difference between a potential reference video data block and a current video data block that is to be encoded. In an exemplary video scenario, determining a respective match quality may comprise comparing the video data in a video data block to video data in a current video data block that is to be encoded. Such comparison may, for example, comprise comparing pixel information in the video data block to corresponding pixel information in the current video data block. Such comparison may, for example, comprise determining a sum of squared differences or sum of absolute differences between corresponding pixel data.

Such comparison may also, for example, comprise positioning and analyzing a video data block at a variety of spatial positions relative to the current video data block when making the match quality determination. The results of the comparison may, for example, yield one or more regional data blocks from one or more regions of video data blocks that best match the current video data block.

In various exemplary scenarios, determining a respective match quality between a current video data block and one or more of the plurality of video data blocks may comprise determining at least a portion of the respective match qualities prior to completing the encoding of all reference video data blocks ultimately used to encode the current video data block (e.g., a previous video data block adjacent to the current video data block in the current video frame). In other words, in various scenarios, all reference video data blocks for the current video data block may not be fully processed prior to performing at least a portion of processing (e.g., match quality processing) with the current video data block. This may, for example, provide for a substantial amount of parallel processing between video data blocks in a video frame.

In general, step 240 may comprise determining a respective match quality for at least one of the plurality of video data blocks in each (or at least one) of the plurality of regions. Accordingly, the scope of various aspects of the present invention should not be limited by characteristics of a particular match quality, way of determining match quality, or way of utilizing match quality to distinguish between video data blocks.

The method 200, at step 250, may comprise selecting, based at least in part on respective match quality, a set of regional video data blocks comprising at least one of the plurality of video data blocks from at least one of the plurality of regions. For example, step 250 may comprise selecting one or more video data blocks from one or more regions. In an exemplary scenario, step 250 may comprise selecting a single video data block from each of the plurality of regions (e.g., the video data block with the highest match quality in each region). Alternatively, for example, step 250 may comprise selecting up to N video data blocks from each region. Alternatively, for example, step 250 may comprise determining and analyzing match quality for video data blocks until a threshold is reached or other criterion is met. Also, for example, not every region must have a corresponding selected video data block.

In general, step 250 may comprise selecting, based at least in part on respective match quality, a set of regional video data blocks comprising at least one of the plurality of video data blocks from at least one of the plurality of regions. Accordingly, the scope of various aspects of the present invention should not be limited by characteristics of a particular set of regional data blocks or particular method of determining a set of regional data blocks.

The method 200, at step 260, may comprise determining a respective match cost for one or more of the set of regional video data blocks. Step 260 may, for example and without limitation, share various characteristics with step 160 of the method 100 illustrated in FIG. 1 and discussed previously. Match cost, for example, was generally discussed previously with regard to the exemplary method 100 illustrated in FIG. 1.

For example and without limitation step 260 may comprise determining any of a large number of indications of match cost. Various exemplary match costs may, for example, comprise an amount of data in a resulting encoded block, amount of distortion resulting from an encoded block, degree of difference between a resulting motion vector and one or more reference motion vectors, extent of difference between a resulting set of motion side information and one or more reference sets of motion side information, etc.

In an exemplary video scenario, step 260 may comprise determining match cost for a regional video data block as a function of the amount of data that would be needed to encode the current video data block utilizing the regional video data block. Such a determination may, for example, comprise determining an indication of the number of bits required to communicate a data vector comprising motion information corresponding to a regional data block based on motion side information for a previous video data block in the same video frame as the current video data block. Such a determination may, for example, comprise estimating the amount of data or determining an exact amount of such data.

As explained earlier with regard to step 240, match quality for various video data blocks may be determined prior to completing the encoding of a previous video data block. In a non-limiting exemplary scenario, the match cost determined at step 260 may depend on one or more completely encoded reference video data blocks (e.g., a previous video data block in the current video frame and adjacent to a current video block being encoded). Accordingly, in various scenarios, step 260 may comprise determining match cost after the encoding for various reference video data blocks has been completed. In other words, various aspects of the present invention may provide for performing a first portion of processing video information in a current video data block in parallel with processing video information in a previous video data block, and various aspects of the present invention may provide for performing a second portion of processing video information in the current video data block in series with processing video information in the previous video data block. Note, however, that this is merely an exemplary scenario, and accordingly, the scope of various aspects of the present invention should not be limited by such a combination of parallel and serial processing.

In general, step 260 may comprise determining a respective match cost for one or more of the set of regional data blocks. Accordingly, the scope of various aspects of the present invention should not be limited by characteristics of a particular match cost or way of determining a particular match cost.

The method 200, at step 270, may comprise selecting one or more reference data blocks from the set of regional data blocks, based at least in part on the match cost(s) determined at step 260. Step 270 may, for example and without limitation, share various characteristics with step 160 of the method 100 illustrated in FIG. 1 and discussed previously.

Step 270 may, for example, utilize the determined match costs (e.g., as selected at step 260) to compare a portion or all of the regional data blocks to determine one or more reference data blocks to utilize in encoding the current data block. Also, for example, step 270 may comprise utilizing the determined match qualities (e.g., as selected at step 240) to compare a portion or all of the regional data blocks. In an exemplary scenario, step 270 may comprise utilizing respective match qualities and match costs to compare a portion or all of the regional data blocks. For example, step 270 may comprise rating a portion or all of the regional data blocks according to a weighted average of respective match quality and respective match cost, and selecting one or more reference blocks based on such ratings.

In general, step 270 may comprise selecting one or more reference data blocks from the set of regional data blocks, based at least in part on the match cost(s) determined at step 260. Accordingly, the scope of various aspects of the present invention should not be limited by characteristics of a particular match cost selection criterion or result.

The method 200, at step 280, may comprise utilizing the reference data block(s) (e.g., reference data block(s) selected at step 270) to encode video information. Step 280 may, for example and without limitation, share various characteristics with step 170 of the method 100 illustrated in FIG. 1 and discussed previously. For example, step 280 may comprise utilizing the selected reference video data block(s) to encode the current video data block in a block-encoding scheme. Also for example, step 280 may comprise utilizing the selected reference video data block(s), along with previous video data blocks in the same video frame as the current video data block, to encode the current video data block. The scope of various aspects of the present invention should not be limited by characteristics of a particular video data encoding scheme (e.g., how a particular video data encoding scheme may utilize the selected reference video block(s) to encode the current video data block).

The method 200, at step 290, may comprise performing continued processing. Step 290 may, for example and without limitation, share various characteristics with step 180 of the exemplary method 100 illustrated in FIG. 1 and discussed previously. For example, such continued processing may comprise encrypting sensitive encoded video information. Such continued processing may, for example comprise encoding additional data (e.g., video or audio data) and/or communicating encoded video data to a receiving video entity. Such a receiving video entity may, for example, be remote from the system implementing the method 200. For example, such a remote video entity may comprise a television, videophone, computer, modem, video database, etc. In general, step 290 may comprise performing continued processing, and accordingly, the scope of various aspects of the present invention should not be limited by characteristics of particular continued processing.

Figure 3:
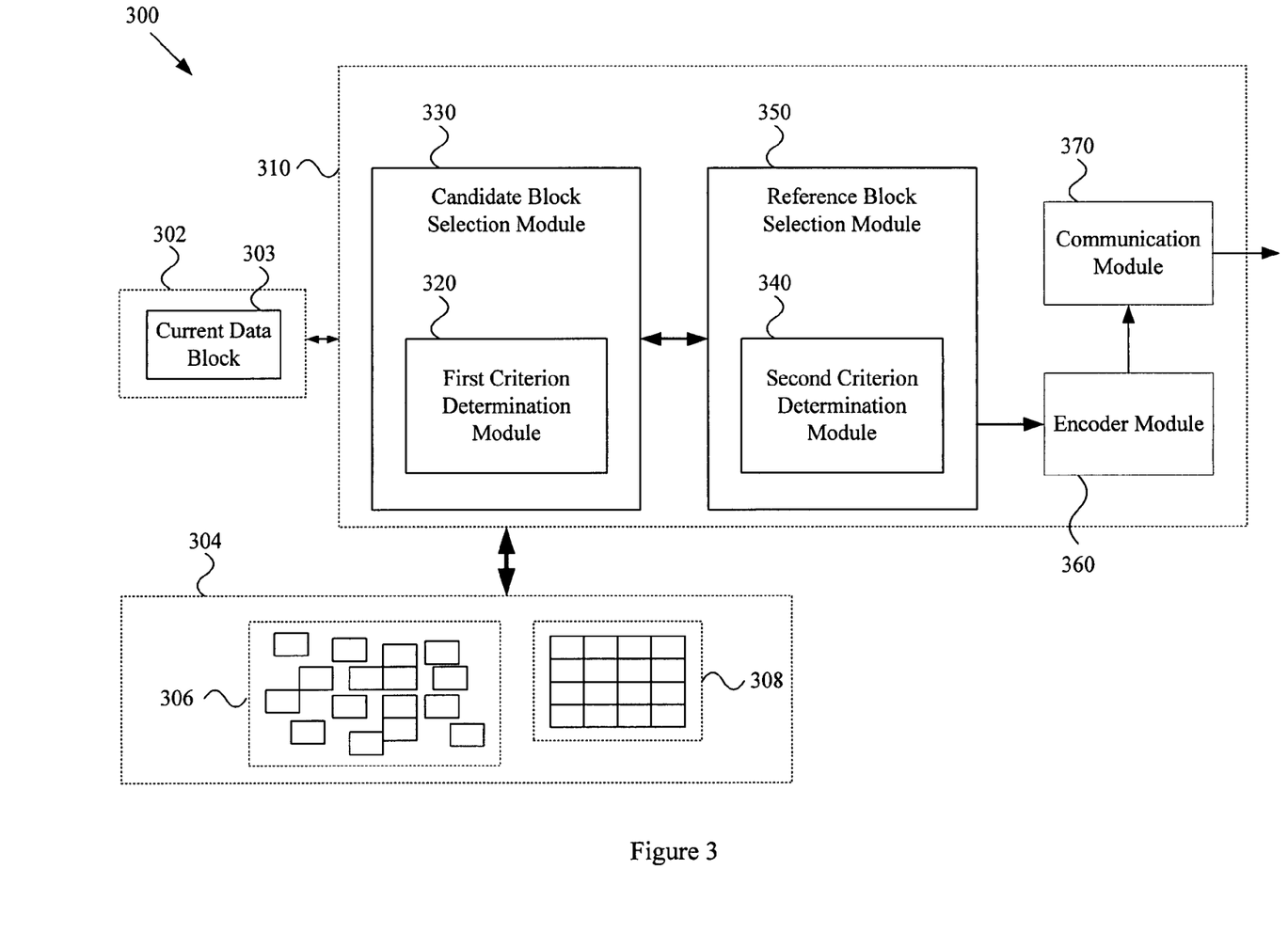
FIG. 3 shows a block diagram of an exemplary system for processing data, in accordance with various aspects of the present invention.

FIG. 3 shows a block diagram of an exemplary system 300 for processing data, in accordance with various aspects of the present invention. Various modules or components of the exemplary system 300 may, for example and without limitation, perform various steps of the methods 100, 200 illustrated in FIGS. 1-2 and discussed previously.

The exemplary system 300 may comprise a memory 302 that comprises a current data block 303 and a memory 304 that comprises information of a first set of data blocks 306 and a second set of data blocks 308. The memory 302 and memory 304 may, for example, be independent memory devices or may, for example, be portions of the same memory device. The data blocks may, for example and without limitation, comprise blocks of video information. For example, the current data block 303 may comprise a block of video information for a current data block of a current video frame that is to be encoded, and the first and second sets of data blocks 306, 308 may comprise blocks of video information for a different video frame (e.g., the video frame prior to the current video frame in a stream of video frames). As illustrated in FIG. 3, the first and/or second sets of data blocks 306, 308 may comprise an ordered array of data blocks (as shown in the second data block 308) and/or a less structured set of data blocks (as shown in the first data block 306).

The current data block 303 and the first and second sets of data blocks 306, 308 may generally comprise respective blocks of data. Accordingly, the scope of various aspects of the present invention should not be limited by characteristics of a particular block information type (e.g., video information), block type, block shape, or style of block organization.

The exemplary system 300 may comprise an information processing sub-system 310 communicatively coupled to the memory 302, 304. The system 300 and/or information processing sub-system 310 may comprise a plurality of processing modules. Such processing modules may, for example, be integrated into a single integrated circuit or may, for example, comprise a plurality of integrated circuits on a circuit board. Such processing modules may, for example, be components of a local or distributed system. Such processing modules may, for example, be implemented using hardware, software or a combination thereof. Accordingly, the scope of various aspects of the present invention should not be limited by characteristics of a particular implementation of the system 300 or sub-system 310.

The exemplary system 300 may comprise a candidate block selection module 330 that determines a set of candidate data blocks from a larger set of data blocks. The candidate block selection module 330 may, for example and without limitation, perform various aspects of the method 100 (e.g., steps 140-150) illustrated in FIG. 1 and discussed previously.

The candidate block selection module 330 may, for example, select at least a first candidate data block from the first set of data blocks 306, based at least in part on a first selection criterion.

The candidate block selection module 330 may, for example, comprise a first criterion determination module 320 that determines the first selection criterion for the data blocks being analyzed. The first criterion determination module 320 may, for example, utilize the first selection criterion to compare a portion or all of the data blocks in the first set of data blocks 306 to determine one or more candidate data blocks from the first set of data blocks 306 for further processing.

For example and without limitation, the first criterion determination module 320 may determine a respective match quality between one or more of the data blocks in the first set of data blocks 306 and the current data block 303. The first criterion determination module 320 may, for example, utilize any of a large number of indications of match quality between data blocks.

In an exemplary video scenario, the first criterion determination module 320 may compare the video data in each data block of the first set of data blocks 306 to video data in the current data block 303 that is to be encoded. Such comparison may, for example, include comparing corresponding pixel information in the data blocks 306 to the pixel information in the current data block 303. Such comparison may, for example, comprise determining a sum of squared differences or sum of absolute differences between corresponding pixels.

Such a comparison may also, for example, comprise positioning and analyzing each compared data block 306 at a variety of spatial positions relative to the current video data block 303. The results of the comparison may, for example, yield one or more candidate data blocks in the first set of data blocks 306 that best match the current data block 303.

In general, the first criterion determination module 320 may determine respective first criterion indications for various data blocks. Accordingly, the scope of various aspects of the present invention should not be limited by characteristics of a particular first criterion or way of determining or utilizing a first criterion for various data blocks.

In general, the candidate block selection module 330 may determine a set of candidate data blocks from one or more sets of data blocks. For example, the candidate block selection module 330 may determine at least a first candidate data block from the first set of data blocks 306 based at least in part on a first selection criterion (e.g., as determined by the first criterion determination module 320). The candidate block selection module 330 may also, for example, select at least a second candidate data block from the second set of data blocks 308 (e.g., based on the first selection criterion). The candidate block selection module 330 may generally select any number of candidate data blocks from any number of sets of data blocks. Accordingly, the scope of various aspects of the present invention should by no means be limited by a particular number of candidate data blocks or grouping of such candidate data blocks.

The exemplary system 300 may comprise a reference block selection module 350 that selects one or more reference data blocks from a set of candidate data blocks based at least in part on a second selection criterion. The reference block selection module 350 may, for example and without limitation, perform various aspects of the method 100 (e.g., step 160) illustrated in FIG. 1 and discussed previously.

The reference block selection module 350 may, for example, select one or more reference data blocks from a set of candidate data blocks based at least in part on a second selection criterion. The set of candidate data blocks may, for example, comprise the candidate data blocks identified by the candidate block selection module 330. The second selection criterion may, for example, be substantially different than the first selection criterion.

The reference block selection module 350 may comprise a second criterion determination module 340 that determines second selection criterion for one or more of the set of candidate data blocks. The reference block selection module 350 may then utilize the results of the second criterion determination module 340 to compare a portion or all of the set of candidate data blocks to determine one or more reference data blocks to utilize in encoding the current data block.

For example and without limitation, the second criterion determination module 340 may determine a respective match cost between one or more of the set of candidate data blocks, and the reference block selection module 350 may select one or more reference data blocks from the set of candidate data blocks based at least in part on the determined respective match costs. The reference block selection module 350 may, for example, utilize any of a large number of indications of match cost to compare the candidate data blocks. Various exemplary match costs may, for example and without limitation, comprise an amount of data in a resulting encoded block, amount of distortion corresponding to an encoded block, degree of difference between a resulting motion vector and one or more reference motion vectors, extent of difference between a resulting set of motion side information and one or more reference sets of motion side information, etc.

In an exemplary video scenario, the second criterion determination module 340 may determine match cost for a candidate video data block as a function of the amount of data that would be needed to encode the current video data block utilizing the candidate video data block. Such a match cost determination may, for example, comprise estimating the amount of data or determining an exact amount of such data.

For example and without limitation, the second selection criterion may comprise aspects of the first selection criterion utilized previously by the candidate block selection module 330. For example, the reference block selection module 350 may utilize previously determined respective match quality indications to compare the candidate data blocks. The reference block selection module 350 may, for example, compare the candidate data blocks based on a function of match quality and match cost. Such a function may, for example, comprise a weighted average of match quality and match cost.

In general, the reference block selection module 350 may select one or more reference data blocks from the set of candidate data blocks based at least in part on a second selection criterion. Accordingly, the scope of various aspects of the present invention should not be limited by characteristics of a particular second selection criterion.

The exemplary system 300 may comprise an encoder module 360 that encodes information of the current data block 303. The encoder module 360 may, for example and without limitation, perform various aspects of the method 100 (e.g., step 170) illustrated in FIG. 1 and discussed previously. For example, the encoder module 360 may utilize the reference data block(s) selected by the reference block selection module 350 to encode the current data block in accordance with a block-encoding scheme. The scope of various aspects of the present invention should not be limited by characteristics of a particular encoder module or encoding strategy.

The exemplary system 300 may comprise a communication module 370 that communicates information of the encoded current data block to a remote receiver. The communication module 370 may, for example and without limitation, perform various aspects of the method 100 illustrated in FIG. 1 and discussed previously.

The communication module 370 may, for example, encrypt information for secure communication. The communication module 370 may, for example, communicate encoded data to any of a variety of receiving entities. Such a receiving entity may, for example, be remote from the system 300. For example, such a remote entity may comprise a television, telephone, computer, modem, database, radio, etc. In general, the communication module 370 may perform various types of communication processing on the data encoded by the encoder module 360, and accordingly, the scope of various aspects of the present invention should not be limited by characteristics of particular communication processing.

Figure 4:
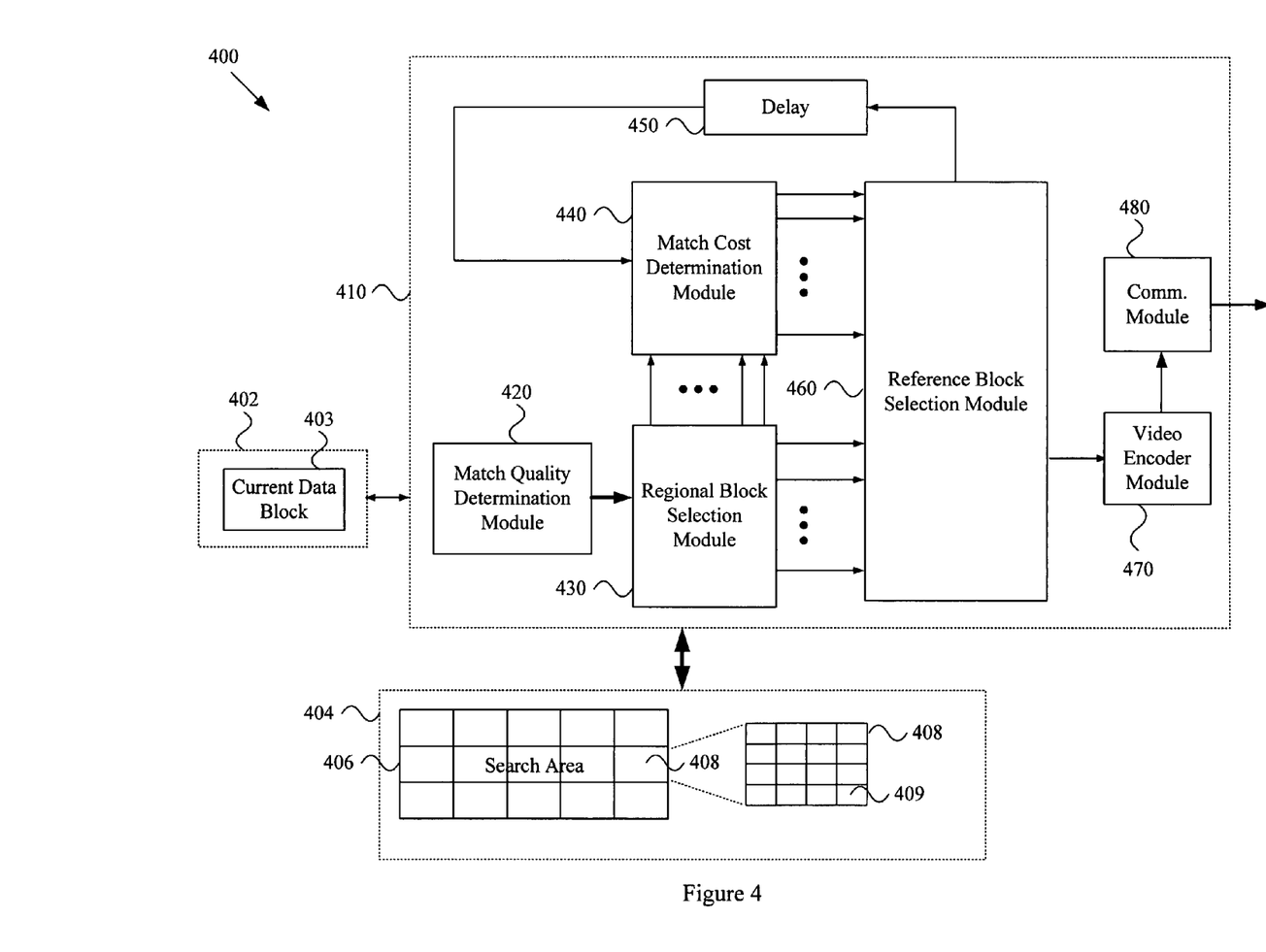
FIG. 4 shows a block diagram of an exemplary system for processing video data, in accordance with various aspects of the present invention.

FIG. 4 shows a block diagram of an exemplary system 400 for processing video data, in accordance with various aspects of the present invention. Various modules or components of the exemplary system 400 may, for example and without limitation, perform various steps of the methods 100, 200 illustrated in FIGS. 1-2 and discussed previously. In addition, various modules or components of the exemplary system 400 may, for example and without limitation, share various characteristics of various corresponding modules or components of the exemplary system 300 illustrated in FIG. 3 and discussed previously. Though the exemplary system 400 is generally a video signal processing system, the video signal processing scenario is presented for illustrative purposes only, and accordingly, the scope of various aspects of the present invention should not be limited by video-specific characteristics of the exemplary system 400 as illustrated in FIG. 4 or as discussed below.

The exemplary system 400 may comprise a memory 402 that comprises a current video data block 403 and a memory 404 that comprises potential reference video information. The memory 402 and memory 404 may, for example, be independent memory devices or may, for example, be portions of the same memory device. The current video data block 403 may, for example, comprise a block of video information for a video block of a current video frame that is to be encoded, and the memory 404 may comprise blocks of video information corresponding to a different video frame (e.g., a previous video frame) that are potentially to be used to encode the current video data block 403.

The memory 404 may, for example, comprise a search area 406 that is defined to comprise blocks of video data that potentially may be used to encode the current video data block 403. The search area may, for example, be sectioned into a plurality of video data block regions (one of which is denoted by label 408). As illustrated in FIG. 4, a video data block region 408 may comprise a plurality of video data blocks (one of which is denoted by label 409). Though, the exemplary search area 406 and video data block region 408 are shown in a rectangular configuration, this configuration is merely one of convenience. Accordingly, the scope of various aspects of the present invention should by no means be limited to a particular spatial dimension, shape, size or arrangement of video data block(s).

The video data block regions (e.g., video data block region 408) of the search area 406 may comprise video data blocks assigned to a video data block region according to a selection criterion. For example and without limitation, in an exemplary video-processing scenario, video data blocks may be assigned to a video data block region according to predicted similarity of match cost. For example, the video data blocks (e.g., video data block 409) in a particular video data block region (e.g., video data block region 408) may each be determined to likely result in similar respective match costs should any of the video data blocks be utilized to encode the current video data block 403. Such a determination may, for example, be based on spatial proximity of video information that is represented in the video data blocks in a video data block region. Note, however, that match cost is merely one example of a selection criterion that may be utilized to define video data block regions of video data blocks in a search area. Accordingly, the scope of various aspects of the present invention should not be limited by characteristics of a selection criterion utilized to define video data block regions of video data blocks.

The exemplary system 400 may comprise an information processing sub-system 410 communicatively coupled to the memory 402, 404. The system 400 and/or information processing sub-system 410 may comprise a plurality of processing modules. Such processing modules may, for example, be integrated into a single integrated circuit or may, for example, comprise a plurality of integrated circuits on a circuit board. Such processing modules may, for example, be implemented using hardware, software or a combination thereof. Accordingly, the scope of various aspects of the present invention should not be limited by characteristics of a particular implementation of the system 400 or sub-system 410.

The exemplary system 400 may comprise a match quality determination module 420 that determines match quality for at least one video data block in at least one of the video data block regions. The match quality determination module 420 may, for example and without limitation, share various characteristics with the first criterion determination module 320 illustrated in FIG. 3 and discussed previously. The match quality determination module 420 may also, for example and without limitation, perform various aspects of the methods 100, 200 (e.g., steps 140 and 240) illustrated in FIGS. 1-2 and discussed previously.

The match quality determination module 420 may, for example, determine a respective match quality between one or more of the video data blocks (e.g., video data block 409) in one or more of the video data block regions (e.g., video data block region 408). Match quality for a video data block may be determined according to any of a large variety of match quality criteria. For example, match quality may generally comprise information of difference between a video data block and the current video data block 403.

In an exemplary scenario, the match quality determination module 420 may compare data in each of the plurality of video data blocks (e.g., video data block 409) in each of the plurality of video data block regions (e.g., video data block region 408) to data in the current video data block 403 that is to be encoded. Such comparison may, for example, comprise comparing corresponding pixel information in the video data blocks to the pixel information in the current video data block 403. Such comparison may, for example, comprise determining a sum of squared differences or sum of absolute differences between corresponding pixels.

Such a comparison may also, for example, comprise positioning each compared video data block (e.g., video data block 409) at a variety of spatial positions relative to the current video data block 403 and determining an indication of match quality at each of the spatial positions. The results of the comparison may, for example, yield one or more regional video data blocks in one or more of the regions of video data blocks that best match the current video data block 403.

In an exemplary scenario, the match quality determination module 420 may determine match quality for at least a portion of the video data blocks prior to completing encoding of all video data blocks utilized to encode the current video data block 403. For example, in an exemplary scenario the system 400 may be processing a previous video data block in addition to the current video data block 403, where the previous video data block will be utilized to encode the current video data block 403 (e.g., the previous video data block may be adjacent to the current video data block 403 in the same video frame). In the exemplary scenario, the match quality determination module 420 may determine match quality for at least a portion of the video data blocks relative to the current video data block 403 before the system 400 has completed the encoding of the previous video data block.

In general, the match quality determination module 420 may determine match quality for at least one video data block in at least one of the video data block regions. Accordingly, the scope of various aspects of the present invention should not be limited by characteristics of a particular match quality determination or way of determining match quality for a video data block.

The exemplary system 400 may comprise a regional block selection module 430 that selects a set of regional video data blocks from the video data blocks (e.g., video data block 409) in the plurality of video data block regions (e.g., video data block region 408) based at least in part on the match quality determined by the match quality determination module 420. The regional block selection module 430 may, for example and without limitation, share various characteristics with the candidate block selection module 330 of the exemplary system 300 illustrated in FIG. 3 and discussed previously. The regional block selection module 430 may also, for example and without limitation, perform various aspects of the methods 100, 200 (e.g., steps 140-150 and 250) illustrated in FIGS. 1-2 and discussed previously.

The regional block selection module 430 may, for example, receive match quality information from the match quality determination module 420. In an exemplary scenario, such match quality information may correspond to all (or a portion) of the video data blocks in the plurality of video data block regions. The regional block selection module 430 may then, for example, select a set of regional video data blocks based at least in part on their respective match qualities.

A set of regional video data blocks may, for example, comprise a single video data block from each video data block region, where the single video data block has the highest match quality of the video data blocks in the single video data block's respective region. Alternatively, for example, a set of regional video data blocks may comprise more than one video data block from each region (e.g., up to N video data blocks with the highest match quality). Alternatively, for example, a set of regional video data blocks may comprise no video data blocks from one or more video data block regions (e.g., where the match quality is below a required threshold).

In general, the regional block selection module 430 may select a set of regional video data blocks from the video data blocks in the plurality of video data block regions based at least in part on the determined match quality. Accordingly, the scope of various aspects of the present invention should not be limited by characteristics of a particular set of regional video data blocks or particular method of determining a set of regional video data blocks.

The exemplary system 400 may comprise a match cost determination module 440 that determines match cost for at least one of the set of regional video data blocks selected by the regional block selection module 430. In an exemplary scenario, the match cost determination module 440 may determine match cost for each of the set of regional video data blocks.

The match cost determination module 440 may, for example and without limitation, share various aspects with the second criterion determination module 340 of the system 300 illustrated in FIG. 3 and discussed previously. The match cost determination module 440 may also, for example and without limitation, perform various aspects of the methods 100, 200 (e.g., steps 160 and 260) illustrated in FIGS. 1-2 and discussed previously.

The match cost determination module 440 may, for example, determine any of a large variety of indications of match cost. Various exemplary match costs may, for example, comprise an amount of data in a resulting encoded video data block, amount of distortion resulting from an encoded video data block, degree of difference between a resulting motion vector and one or more reference motion vectors, extent of difference between a resulting set of motion side information and one or more reference sets of motion side information, etc.

In an exemplary video scenario, the match cost determination module 440 may determine match cost for a regional video data block as a function of the amount of data that would be needed to encode the current video data block 403 utilizing the regional video data block. Such a determination may, for example, comprise determining an indication of the number of bits required to communicate a data vector comprising motion information corresponding to a regional video data block and based on motion side information for a previous video data block. Such a determination may, for example, comprise estimating an amount of such data or determining an exact amount of such data.

As explained earlier, the match quality determination module 420 may determine match quality for various video data blocks prior to completion of the encoding of all reference blocks utilized to encode the current video data block 403. In a non-limiting exemplary scenario, the match cost determined by the match cost determination module 440 may depend on one or more completely encoded reference video data blocks (e.g., a previous video data block in the current video frame and adjacent to the current video data block 403 being encoded). Accordingly, in various scenarios, the match cost determination module 440 may determine match cost after encoding has been completed for all reference video data blocks utilized to encode the current video data block 403. Note, however, that this is merely an exemplary scenario, and accordingly, the scope of various aspects of the present invention should not be limited by such temporal sequencing of processing.

In general, the match cost determination module 440 may determine a respective match cost for one or more of the set of regional video data blocks. Accordingly, the scope of various aspects of the present invention should not be limited by characteristics of a particular match cost or way of determining a particular match cost.

The exemplary system 400 may comprise a reference block selection module 460 that selects a reference video data block from the set of regional video data blocks based at least in part on determined match cost. For example, the reference block selection module 460 may select one or more reference video data blocks from the set of regional video data blocks determined by the regional block selection module 430 based at least in part on match costs determined by the match cost determination module 440.

The reference block selection module 460 may, for example and without limitation, share various characteristics with the reference block selection module 350 of the system 300 illustrated in FIG. 3 and discussed previously. The reference block selection module may also, for example and without limitation, perform various aspects of the methods 100, 200 (e.g., 160 and 270) illustrated in FIGS. 1-2 and discussed previously.

The reference block selection module 460 may, for example, utilize match costs (e.g., as determined by the match cost determination module 440) to compare a portion or all of the regional video data blocks (e.g., as selected by the regional block selection module 430) to determine one or more reference video data blocks to utilize in encoding the current video data block 403. Also, for example, the reference block selection module 460 may utilize the determined match qualities (e.g., as determined by the match quality determination module 420) to compare a portion or all of the regional video data blocks. In an exemplary scenario, the reference block selection module 460 may comprise utilizing respective match qualities and match costs to compare a portion or all of the regional video data blocks. For example, the reference block selection module 460 may rate a portion or all of the regional video data blocks according to a weighted average of respective match quality and respective match cost, and select one or more reference blocks based on such ratings.

In general, the reference block selection module 460 may select one or more reference video data blocks from the set of regional video data blocks based at least in part on match cost. Accordingly, the scope of various aspects of the present invention should not be limited by characteristics of a particular reference block selection criterion, technique or result.

The exemplary system 400 may comprise a video encoder module 470 that encodes the current video data block 403 based at least in part on the selected reference video data block(s). The video encoder module 470 may, for example and without limitation, share various characteristics with the encoder module 360 of the exemplary system 300 illustrated in FIG. 3 and discussed previously. The video encoder module 470 may also, for example and without limitation, perform various aspects of the methods 100, 200 (e.g., steps 170 and 280) illustrated in FIGS. 1-2 and discussed previously.

The video encoder module 470 may, for example, utilize the one or more reference video data blocks selected by the reference block selection module 460 to encode the current video block using a video block encoding scheme (e.g., one of the MPEG encoding schemes). Also for example, the video encoder module 470 may utilize the selected reference video data block(s), along with previous video data blocks in the same video frame as the current video data block 403, to encode the current video data block 403. The scope of various aspects of the present invention should not be limited by characteristics of a particular video data-encoding scheme.

The exemplary system 400 may also comprise a communication module 480 that communicates encoded video information to a receiving entity. For example, the communication module 480 may communicate encoded video information over a communication network to a video receiver. A video receiver may, for example, comprise aspects of a television, videophone, computer, modem, video memory, etc.

The communication module 480 may, for example, communicate encoded video information over a communication network based on any of a large variety of communication media and protocols. The communication module 480 may, for example, communicate video driving signals to one or more remote video receivers. The scope of various aspects of the present invention should not be limited by characteristics of a particular communication module.

The exemplary methods 100, 200 illustrated in FIGS. 1-2 and discussed previously, and the exemplary systems 300, 400 illustrated in FIGS. 3-4 and discussed previously may, for example, be implemented utilizing a wide range of hardware, software, or a combination thereof. For example, various aspects of the methods 100, 200 and systems 300, 400 may be implemented by a general-purpose processor or an application-specific processor executing software and/or firmware instructions. Also, for example, various aspects may be implemented by discrete hardware. Additionally, for example, various aspects may be implemented by a single integrated circuit or a set of integrated circuits. Further, for example, various aspects may be implemented by a single physical system or a distributed network of physical systems. Accordingly, the scope of various aspects of the present invention should not be limited by a particular system configuration or implementation of any of the exemplary methods or systems previously discussed.

In summary, aspects of the present invention provide a system and method for processing a data block (e.g., encoding a video data block). While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to any particular embodiment disclosed, but that the invention will include all embodiments falling within the scope of the appended claims.

What is claimed is:

1. A method for encoding video information, the method comprising:
    defining a plurality of regions within a search area, where each region comprises a plurality of video data blocks;
    determining a respective match quality for at least one of the plurality of video data blocks from at least one of the plurality of regions;
    selecting, based at least in part on respective match quality, a set of regional video data blocks comprising at least one of the plurality of video data blocks in at least one of the plurality of regions;
    determining a respective match cost for at least one of the set of regional video data blocks;
    selecting a reference video data block from the set of regional video data blocks, based at least in part on the determined match costs;
    utilizing the reference video data block to encode video information; and
    wherein determining a respective match cost for a regional video data block comprises determining an indication of the number of bits required to communicate a data vector comprising motion information corresponding to the regional video data block based on motion side information for a previous video data block.

2. A method for encoding video information in a current video data block, the method comprising:
    defining a plurality of regions within a search area, where each region comprises a plurality of video data blocks;
    determining a respective match quality for at least one of the plurality of video data blocks from at least one of the plurality of regions;
    selecting, based at least in part on respective match quality, a set of regional video data blocks comprising at least one of the plurality of video data blocks in at least one of the plurality of regions;
    determining a respective match cost for at least one of the set of regional video data blocks;
    selecting a reference video data block from the set of regional video data blocks, based at least in part on the determined match costs;
    utilizing the reference video data block to encode video information; and
    wherein selecting a reference video data block from the set of regional video data blocks comprises:
    determining a respective rating for each regional video data block, wherein the respective rating comprises:
    information of difference between the current video data block and the regional video data block; and
    information of an amount of data required to encode the current video data block using the regional video data block; and
    selecting the reference video data block by comparing the respective ratings for the regional video data blocks.

3. A method for encoding video information in a current video data block, the method comprising:
    defining a plurality of regions within a search area, where each region comprises a plurality of video data blocks;
    determining a respective match quality for at least one of the plurality of video data blocks from at least one of the plurality of regions;
    selecting, based at least in part on respective match quality, a set of regional video data blocks comprising at least one of the plurality of video data blocks in at least one of the plurality of regions;
    determining a respective match cost for at least one of the set of regional video data blocks;
    selecting a reference video data block from the set of regional video data blocks, based at least in part on the determined match costs;
    utilizing the reference video data block to encode video information;
    wherein determining a respective match quality for at least one of the plurality of video data blocks each of the plurality of regions comprises determining at least a portion of the respective match qualities prior to completing the encoding of all reference video data blocks utilized to encode the current video data block; and
    wherein determining a respective match cost for at least one of the set of regional video data blocks comprises determining at least a portion of the respective match cost(s) after completing the encoding of all reference video data blocks utilized to encode the current video data block.

4. A video encoding system comprising:
    memory comprising a current video data block to be encoded;
    memory comprising a plurality of video data block regions, each video data block region comprising a plurality of video data blocks;
    at least one module that determines match quality for at least one video data block in at least one of the video data block regions;
    the at least one module selects a set of regional video data blocks from the video data blocks in the plurality of video data block regions based at least in part on the determined match quality;
    the at least one module determines match cost for at least one of the set of regional video data blocks;
    the at least one module selects a reference video data block from the set of regional video data blocks based at least in part on the determined match cost;
    a video encoder module that encodes the current video data block based at least in part on the selected reference video data block; and wherein the match cost for a regional video data block comprises information of a number of bits required to communicate a data vector comprising motion information corresponding to the regional video data block based on motion side information for a previous video data block.

5. A video encoding system comprising:

memory comprising a current video data block to be encoded;

memory comprising a plurality of video data block regions, each video data block region comprising a plurality of video data blocks;

at least one module that determines match quality for at least one video data block in at least one of the video data block regions;

the at least one module selects a set of regional video data blocks from the video data blocks in the plurality of video data block regions based at least in part on the determined match quality;

the at least one module determines match cost for at least one of the set of regional video data blocks;

the at least one module selects a reference video data block from the set of regional video data blocks based at least in part on the determined match cost;

a video encoder module that encodes the current video data block based at least in part on the selected reference video data block; and a communication module that communicates information of the encoded current video data block to a remote receiver.

* * * * *